(12) United States Patent
Naujock

(10) Patent No.: US 7,025,236 B1
(45) Date of Patent: Apr. 11, 2006

(54) COLLAPSIBLE STORAGE BAG WITH COLLAPSIBLE SUPPORT FRAME

(76) Inventor: Gordon L Naujock, 3642 Norport Rd., Port Washington, WI (US) 53074

( * ) Notice: Subject to any disclaimer, the term of this patent is extended or adjusted under 35 U.S.C. 154(b) by 372 days.

(21) Appl. No.: 10/462,432

(22) Filed: Jun. 16, 2003

Related U.S. Application Data (60) Provisional application No. 60/395,933, filed on Jul. 15, 2002.

(51) Int. Cl.
*B62J 11/00* (2006.01)

(52) U.S. Cl. .......................... 224/413; 220/91

(58) Field of Classification Search ............... 224/413, 224/543, 585, 404, 412, 419, 425, 426, 432–440, 224/463, 314, 499, 319–324, 924, 925, 97, 224/99, 105; 220/9.1–9.3; 150/120–126
See application file for complete search history.

(56) References Cited

U.S. PATENT DOCUMENTS

| | | | | |
|---|---|---|---|---|
| 338,892 | A * | 3/1886 | Walker | 220/9.3 |
| 1,817,056 | A * | 8/1931 | Belgard | 224/498 |
| 3,893,648 | A * | 7/1975 | Gilbert | 248/97 |
| 4,010,880 | A * | 3/1977 | Guillot-Munoz | 224/275 |
| 4,061,257 | A * | 12/1977 | St. Clair | 224/508 |
| 4,372,512 | A * | 2/1983 | Wolfe | 248/97 |
| 4,542,839 | A * | 9/1985 | Levine et al. | 224/431 |
| 4,662,548 | A * | 5/1987 | Jackson et al. | 224/432 |
| 4,927,104 | A * | 5/1990 | Miller | 248/97 |
| 5,234,116 | A * | 8/1993 | Kristinsson et al. | 211/201 |
| 5,551,654 | A * | 9/1996 | McNerney | 248/99 |
| 6,830,170 | B1 * | 12/2004 | Abel | 224/634 |

* cited by examiner

*Primary Examiner*—Lien M. Ngo
(74) *Attorney, Agent, or Firm*—Jeffrey W. Sainio (57) ABSTRACT

A collapsible storage bag for use on a vehicle such as a motorcycle, includes a collapsible support frame. In the open state, the bag is strengthened by the frame. In the collapsed state, the frame forms a compact, attractive protective cover over the storage bag.

25 Claims, 9 Drawing Sheets

COLLAPSIBLE STORAGE BAG WITH COLLAPSIBLE SUPPORT FRAME

This application claims priority of provisional application Ser. 60/395,933, filed Jul. 15, 2002.

FIELD OF THE INVENTION

The invention is directed toward the field of travel storage bags for use on a vehicle such as a motorcycle. The bag is collapsible to minimize space, air friction, and unsightliness when not in use.

BACKGROUND OF THE INVENTION

The exciting feel of wind through the hair of a motorcycle rider, often yields to the reality that a motorcycle provides more useful transportation with the addition of practical storage space. Such storage is preferably rigid enough that it will not flap or shift under wind or inertial forces; keeps out the elements; is attractive, unobtrusive, or essentially invisible; and is designed to maximize space, which is at a premium on a 2-wheeled vehicle. Many solutions to this problem have evolved from the cowboy's saddlebag. Rigid and flexible saddlebags and luggage carriers can be found in U.S. Pat. No. 6,223,960 to Powell et al; U.S. Pat. No. 4,934,571 to Shimazaki et al; U.S. Pat. No. 5,303,795 to Buell; U.S. Pat. No. 3,989,174 to Norinsky; U.S. Pat. No. 6,164,821 to Randall; U.S. Pat. No. 4,125,213 to Watkins; and U.S. Pat. No. 3,813,018 to Heltzen.

When storage is not needed on the motorcycle, for esthetic reasons, or to prevent theft when parked, the bags may be disconnected from the motorcycle. Mechanisms for disconnection may be found in U.S. Pat. No. 6,378,643 to Galbraith et al; U.S. Pat. No. 4,244,496 to Litz; and U.S. Pat. No. 5,762,249 to Hann. The esthetics of the storage, and the storage space minimized, may also be improved by making the storage collapsible. Collapsible storage may be found in U.S. Pat. No. 4,125,213 to Watkins; U.S. Pat. No. 3,934,770 to Larsen; and U.S. Pat. No. 6,244,484 to Farrell.

A limitation of these collapsible storage systems, is that while the storage may be flattened in width (the dimension perpendicular to the ordinary direction of vehicular travel), the storage is still large and unsightly when viewed from the side, and a large, especially flat, object is susceptible to catching in the wind, with subsequent irritating flapping or damage and loss. Systems made completely of flexible material are also susceptible to such action in wind, even if not collapsed. A large system may increase air friction with lessened speed and fuel economy, impede the driver, causing safety problems, and interfere with inspection and maintenance.

There exists a need for a motorcycle storage system which collapses to a minimal space; provides protection from the elements; provides stiffness; and causes minimal interference with vehicle operation and maintenance.

SUMMARY OF THE INVENTION

The preferred form of the instant invention provides a storage system comprising a flexible bag with a stiff support frame, which bag and frame collapse in multiple dimensions, such as both width and height, where the support frame also provides stiffness and protection in the deployed state. The frame may be built-in to the motorcycle, making the bag virtually invisible and unobtrusive when not in use.

DETAILED DESCRIPTION OF THE PREFERRED EMBODIMENT

Figure 1:
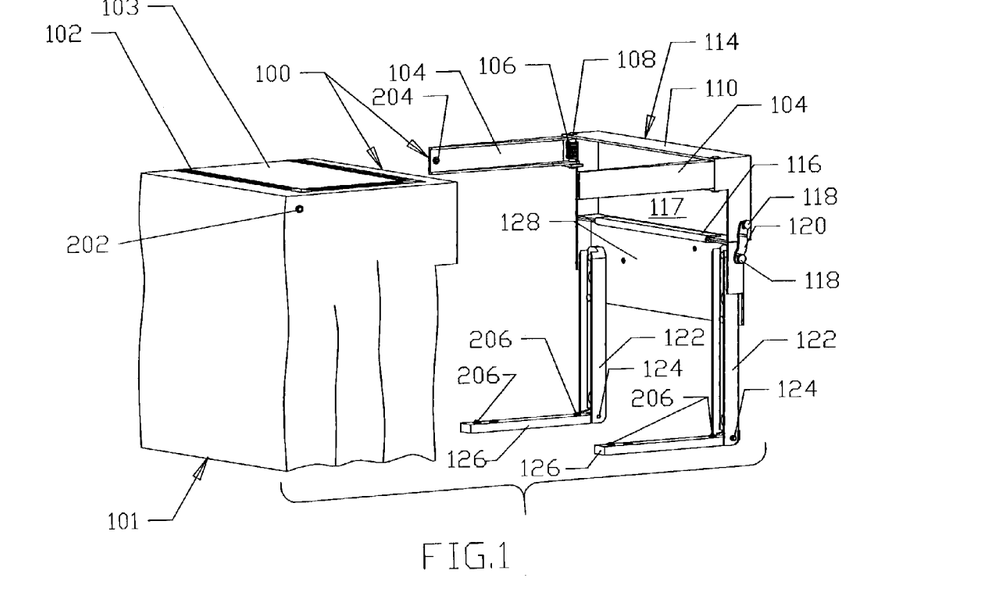
FIG. 1 is an upper side view of the storage bag, exploded from the support frame.

Referring to FIG. 1, the storage system 100 comprises a generally cubical storage bag 101 shown exploded away from a support frame 114. Storage bag 101 is formed of a flexible material such as cloth, leather, or vinyl, capable of collapse. The storage bag 101 has an access flap 103 with a sealing mechanism 102 such as a zipper. The support frame 114 with upper cover 110 is connected to left and right upper support arms 104 with pivot pins 108 and torsion springs 106, forming a hinge. The support frame 114 is also connected to lower back cover 128 through hinge 116, locked in place in the open or closed state by flexible straps 120 held by pins 118. As the hinge 116 is offset from the pins 118, straps 120 stretch if the support frame 114 moves, such as by vibration, away from the open or closed state. Said stretching urges the frame 114 back into place, preventing further unwanted motion from the desired open or closed state. Lower back cover 128 holds left and right risers 122 which in turn hold left and right lower arms 126 through pivot pins 124. A riser 122 plus its hinged lower arm 126 forms a compound lower support. Upper snaps 204 connect to mating snaps 202 on bag 101, and bag 101 is connected to mounting surface 117 by gluing, snaps, rivets, or other conventional means.

Figure 2:
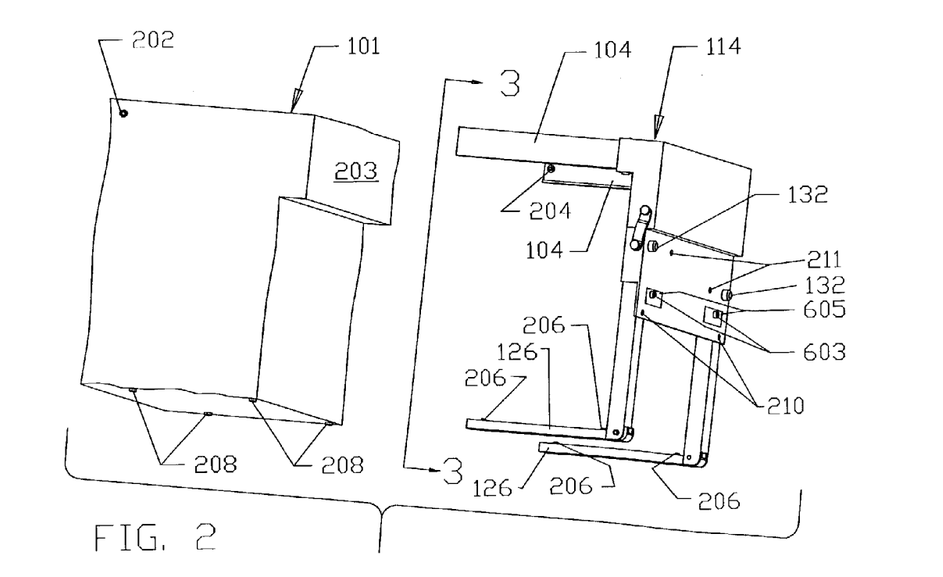
FIG. 2 is a lower side view of the storage bag, exploded from the support frame.

Referring to FIG. 2, bag surface 203 connects to mounting surface 117 (see FIG. 1), and snaps 208 connect to mating snaps 206 on lower arms 126. The corners of bag 101 are thus constrained by frame 114, preventing flapping or displacement with rubbing against the vehicle wheels. The system 100 (FIG. 1) is mounted to the exterior of a vehicle by connectors 603 such as rivets in connection locations 605. Connections locations 605 are defined as locations strong enough to withstand mounting stresses without destruction such as by cracks or rips from vibration, and are reinforced if needed for that purpose, for instance by additional material thickness or a double layer of metal welded onto the location. Connectors 603 may also take the form of screws, welds, glue, or other means. Connectors 603 may be hand-removable (i.e. without the need for tools) devices, such as by snaps, buckles, thumbscrews, or the hook-and-loop fabric system known as Velcro®.

Figure 3:
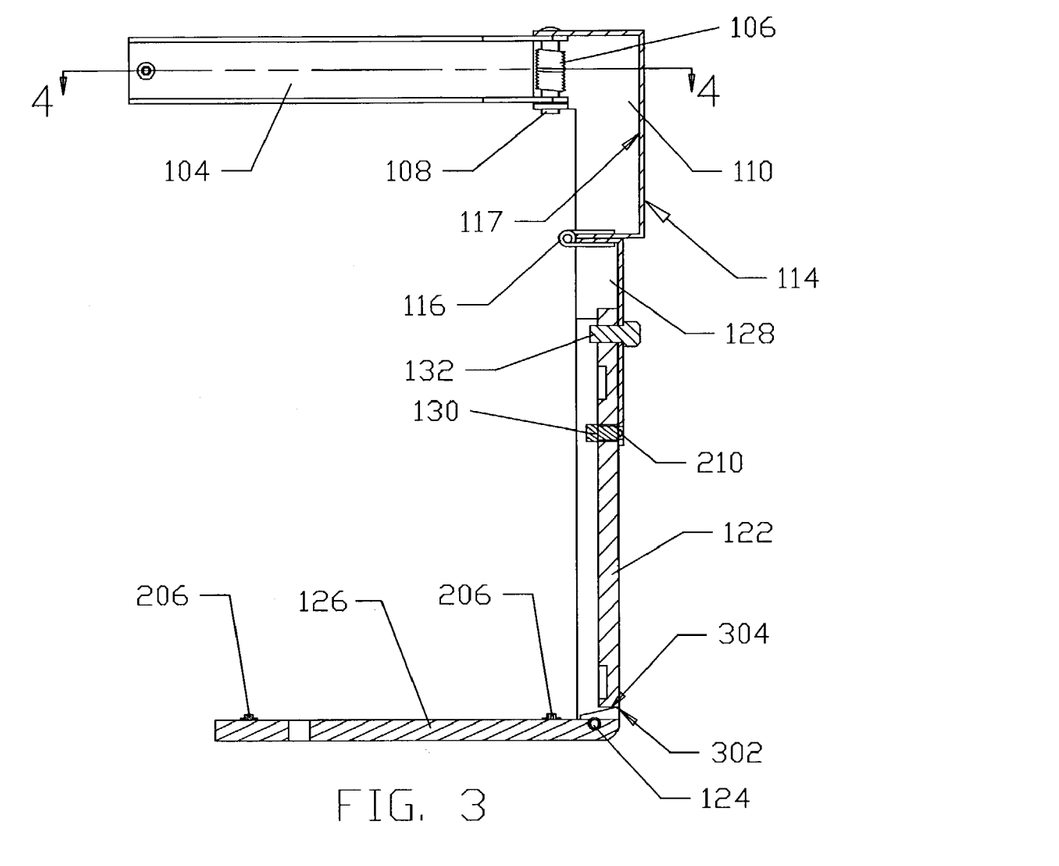
FIG. 3 is a sectional view through the deployed support frame.

FIG. 3 is a sectional view of the support frame 114 in the deployed state. Lower arms 126 attaches to risers 122 by hinges formed by pivot pins 124. Deployment rotation of arms 126 stops when surface 304 contacts surface 302 on riser 122. Spring detents 130 mounted in risers 122 are positioned so the detents 130 engage holes 210 in the deployed state and holes 211 (see FIG. 2) in the collapsed state, thus locking the risers in the desired (open or closed) position. After folding of upper support arms 104, upper cover 110 pivots about hinge 116 downward for the collapsed state. Torsion spring 106 around pivot pin 108 applies pressure to arm 104 to hold arm 104 in the deployed state.

Figure 4:
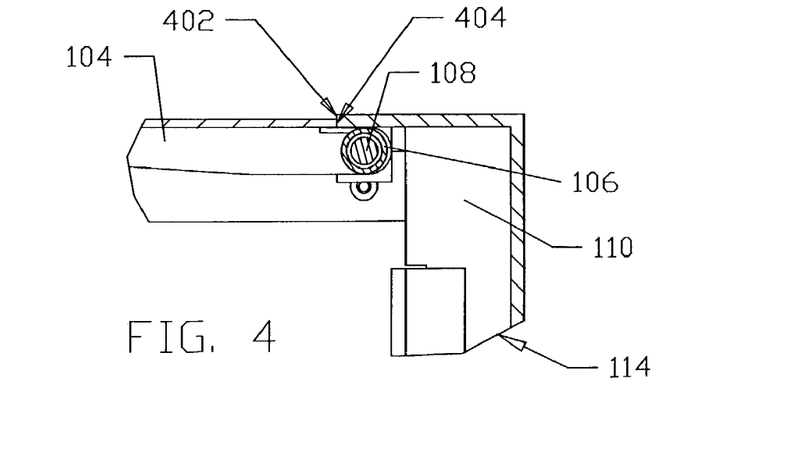
FIG. 4 is a sectional view through the deployed upper arm pivot.

FIG. 4 shows the torsion spring 106 in more detail. Edge 404 of arm 104 contacts edge 402 of upper cover 110 to stop movement from spring 106 on arm 104 in the deployed state.

Figure 5:
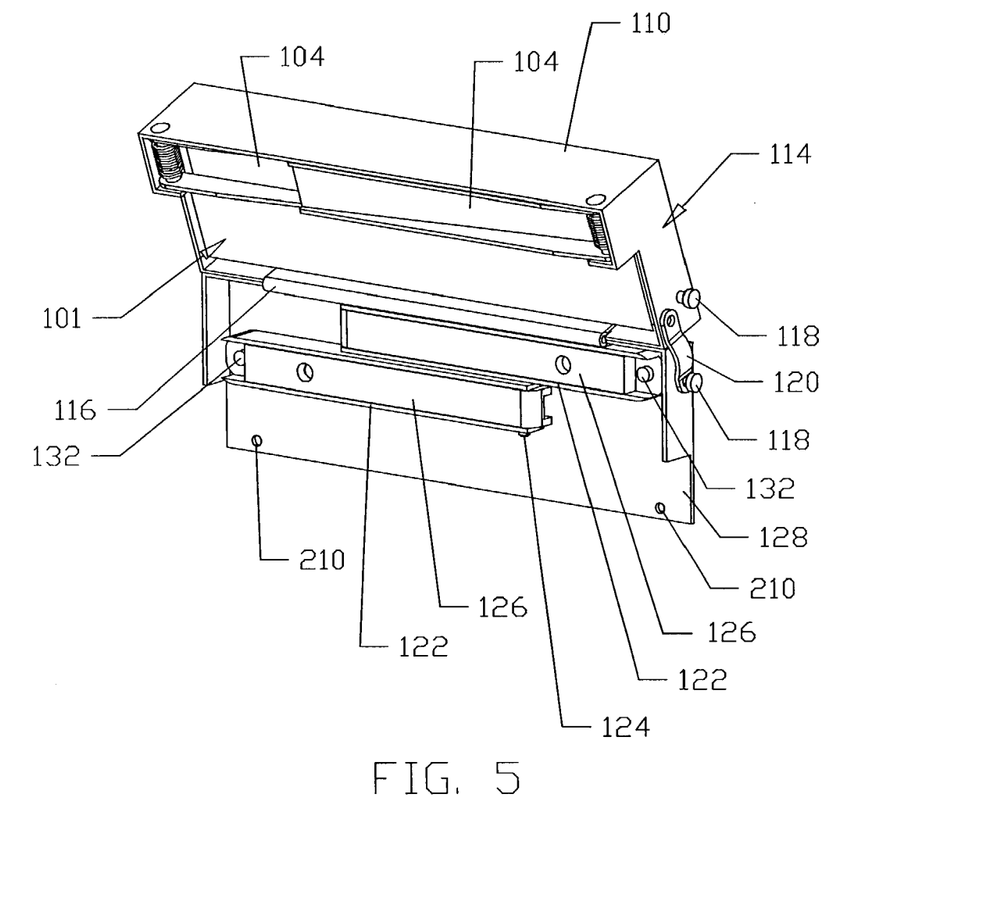
FIG. 5 is a perspective view of the storage bag collapsed and the support frame collapsed for storage with the cover section open.

FIG. 5 shows the storage system almost completely collapsed. Lower arms 126 are folded into risers 122, then risers 122 are pivoted upwardly and inwardly on pivots 132. Upper support arms 104 are similarly folded inwardly into upper cover 110. Bag 101 is collapsed and folded inside frame 114. Upper cover 110 is then swung downward on hinge 116, then straps 120 are reattached to pins 118 which locks upper cover 110 closed. The storage system 100 is therefore collapsed both vertically, and inwardly toward the center of the vehicle, consuming minimal space. Upper cover 110 acts to hold support arms 104 in the deployed state, then as a cover in the collapsed state.

Figure 6:
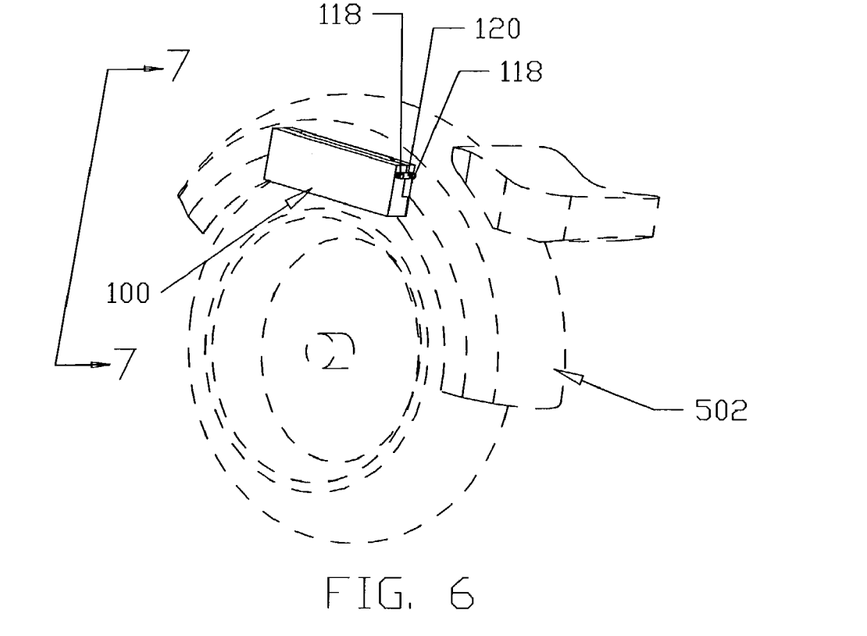
FIG. 6 is a perspective view of the storage bag and support frame in the collapsed state, mounted to a vehicle.

FIG. 6 shows the storage system 100 in the collapsed state, with strap 120 in the locked position, mounted to a vehicle 502 such as a motorcycle.

Figure 7:
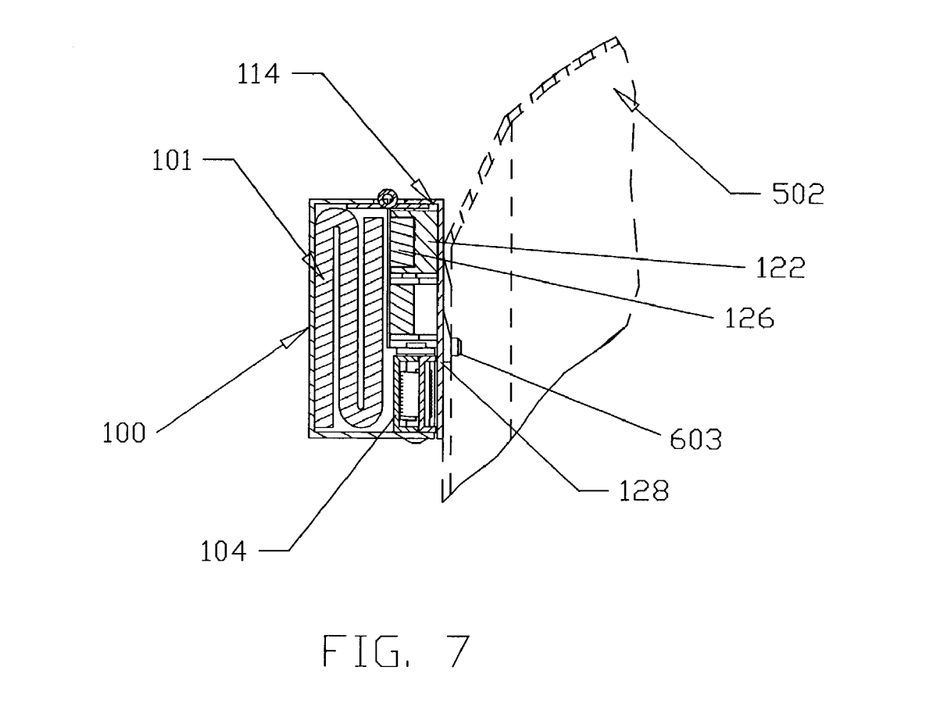
FIG. 7 is a sectional view through the collapsed storage system.

FIG. 7 is a cross section through the storage system 100 showing the folded bag 101.

Figure 8:
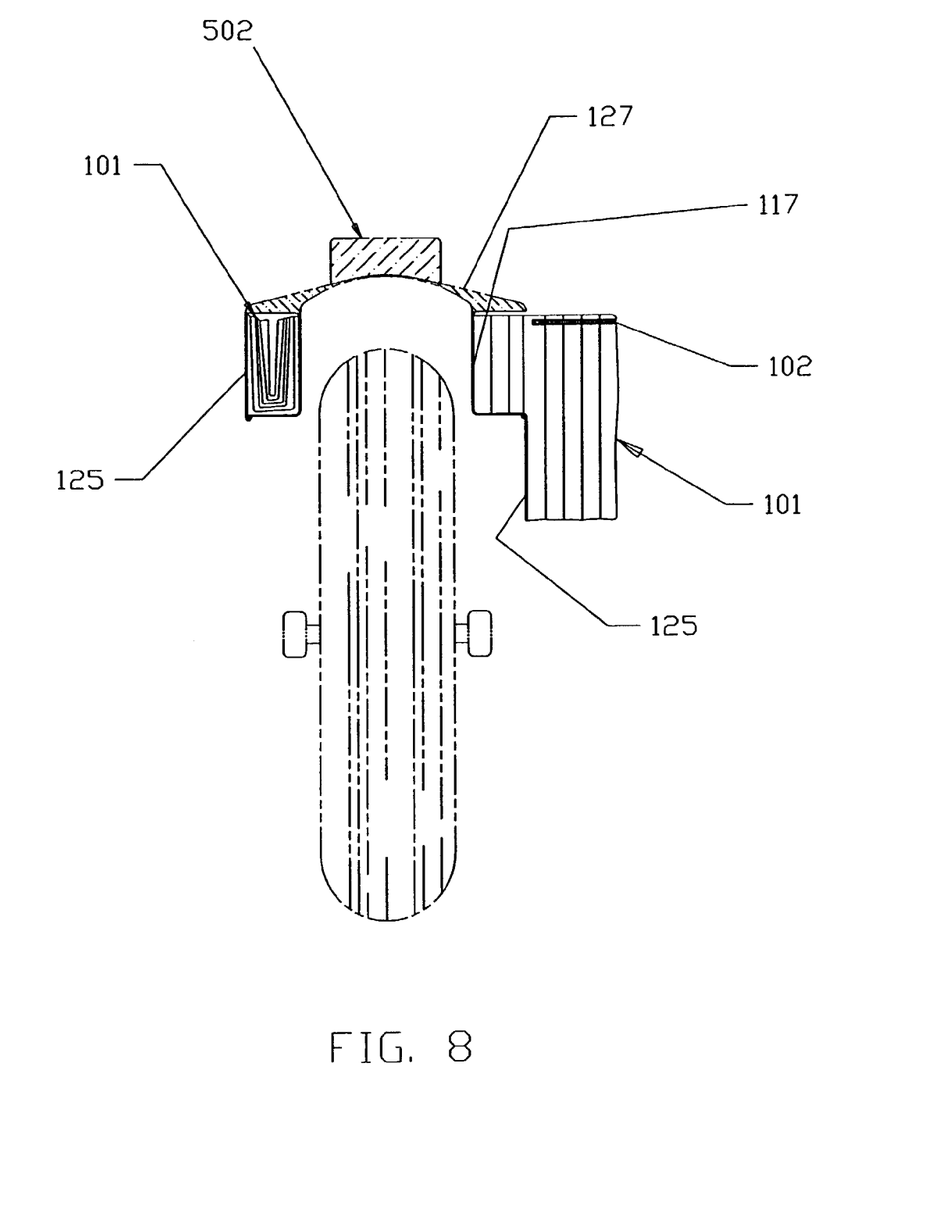
FIG. 8 is a sectional view, showing an alternate form of the storage system, in the collapsed state on the left side of the motorcycle, and in the open state on the right side.

FIG. 8 is a cross section showing a variation of the preferred form, where the frame is internal (i.e. built into the vehicle, as opposed to added-on to the exterior of the vehicle) to a vehicle 502, such as built into a motorcycle fender 127, and the upper support arms 104 are connected to the motorcycle exterior, and the storage bag 101 may be attached to the mounting surface 117 which is also the inner portion of the wheelwell. Lower support 125 rotates downward to open the storage system, and conversely upward to collapse and close. The storage system is shown collapsed on the left side, and opened on the right side. A lock, as is well known in the art, may be used to lock the storage system closed, concealing small items left in the collapsed bag, such as currency. In this internal embodiment the connection location for connecting to the vehicle, comprises the circumference of the frame, the connection to the frame by being constructed with the fender, as in a fiberglass mold designed to form the fender and frame. Alternatively, a hole may be cut in an existing fender, and a frame connected to the fender using, for example, a fiberglass repair kit, which connects by gluing the frame to the fender. The lower support 125 in this embodiment has a similar appearance and operation to the well-known vehicular glovebox.

Figure 9:
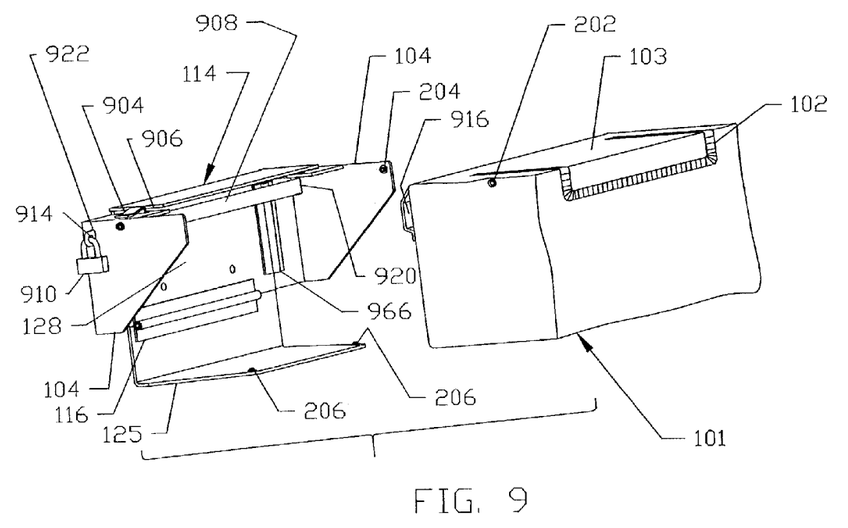
FIG. 9 is a view of another alternate form of the storage system, with the bag exploded from the support frame.

FIG. 9 shows another alternate construction of the storage system. The storage bag 101 is shown exploded away from the support frame 114. Rather than being formed of two folding arms, lower support 125 is comprised of a single right-angled cover segment, rotating off lower back cover 128 with hinge 116. The bag 101 has access flap 103 with sealing mechanism such as a zipper 102. Support arms 104 are also right-angled, so that collapse is in three dimensions; the storage capacity when in use is therefore maximal in comparison to the collapsed size. Support arms 104 are held in the deployed state by means such as spring clips 904 attached by means such as spot welding, and rotate from lower back cover 128 with hinges 966. The spring clips 904 when deployed, act as a stop against the mounting plate edge 906, holding the upper support arms in the deployed state. Extending from the left support arm to the right support arm is a strap 908. The strap is made of a flexible material with an enlarged section 912 (see FIG. 12) at one end and a hole 914 in the strap on the other end. The strap 908 passes through hole 920 in the forward support arm with the enlarged section 912 of the strap acting as a stop so the strap does not pull through the support arm, then passes through slot 916 in the bag, and finally out hole 922. The rear end of the strap has a lock 910 passing through hole 914 in the strap end, thereby restraining the strap from slipping through the hole in the support arm. When the lock is removed, the strap may be removed, allowing the bag 101 to be removed from the frame 114.

Figure 10:
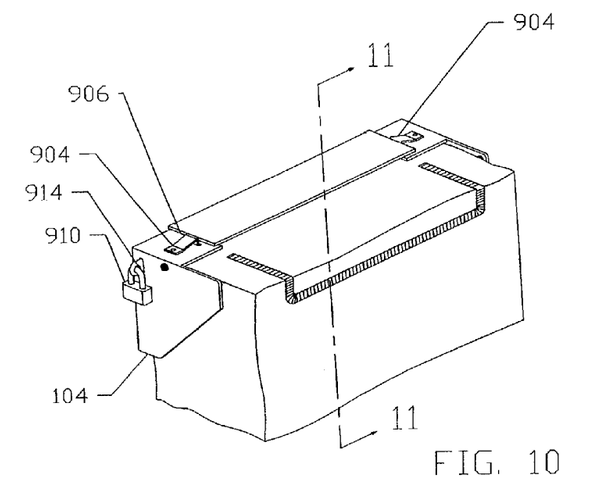
FIG. 10 is a view of the apparatus of FIG. 9, unfolded for normal storage use.

FIG. 10 shows the apparatus of FIG. 9 unfolded for storage use. Spring clips 904 hold arms 104 in place in the open state. Storage bag 101 is shown expanded in three dimensions.

Figure 11:
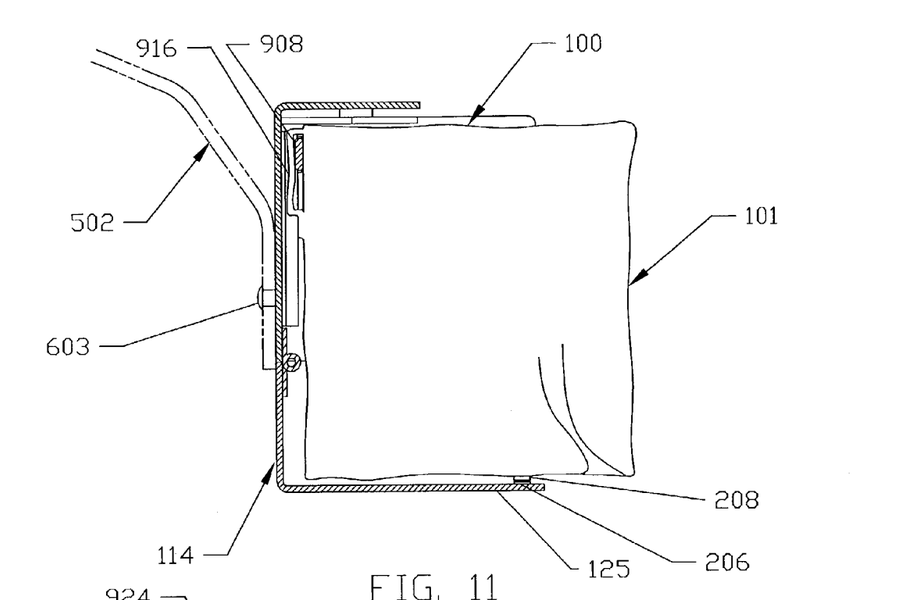
FIG. 11 is a sectional view of the apparatus of FIG. 9.

FIG. 11 is a sectional view of the storage system 100 of FIG. 10. Bag 101 is connected to frame 114 by mounting strap 908, male snaps 206 and female snaps 208. Connectors 603 such as rivets connect the storage system to the vehicle 502.

Figure 12:
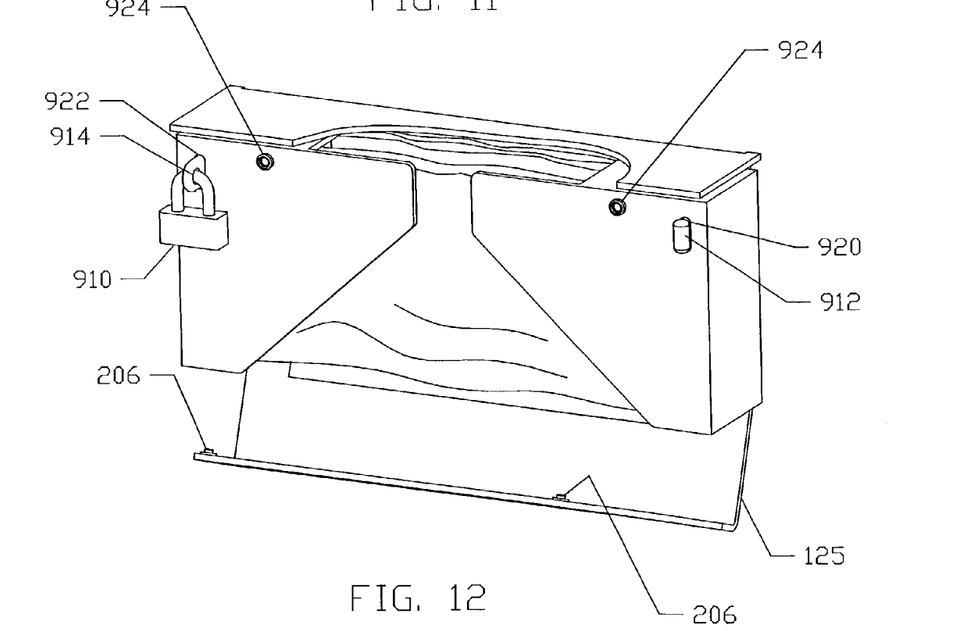
FIG. 12 is a view of the apparatus of FIG. 9, nearly collapsed.

FIG. 12 shows the apparatus of FIG. 9 almost completely closed. Male snaps 206 engage female snaps 924 to lock the cover 125 closed.

Figure 13:
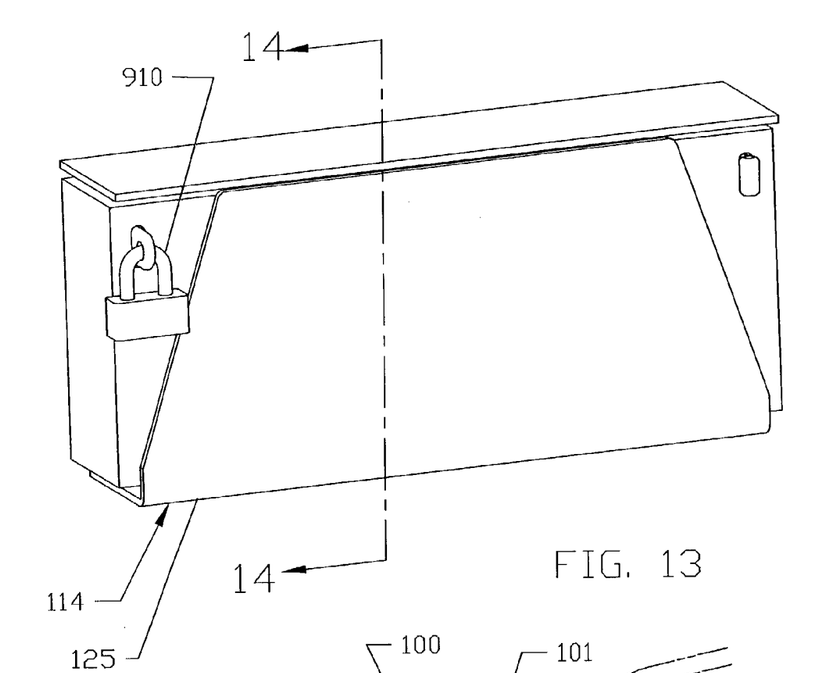
FIG. 13 is a view of the apparatus of FIG. 9, completely collapsed.

FIG. 13 shows the apparatus of FIG. 9 completely closed. Alternatively, if cover 125 is cut to pass behind lock 910, lock 910 will also lock the cover 125 closed.

Figure 14:
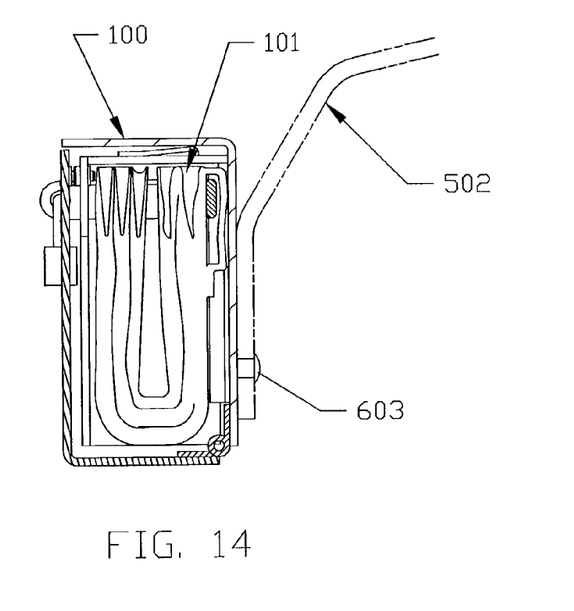
FIG. 14 is a sectional view through the apparatus of FIG. 13.

FIG. 14 is a sectional view through FIG. 13, showing the folded bag 101 and connectors 603 connecting the system to vehicle 502.

Figure 15:
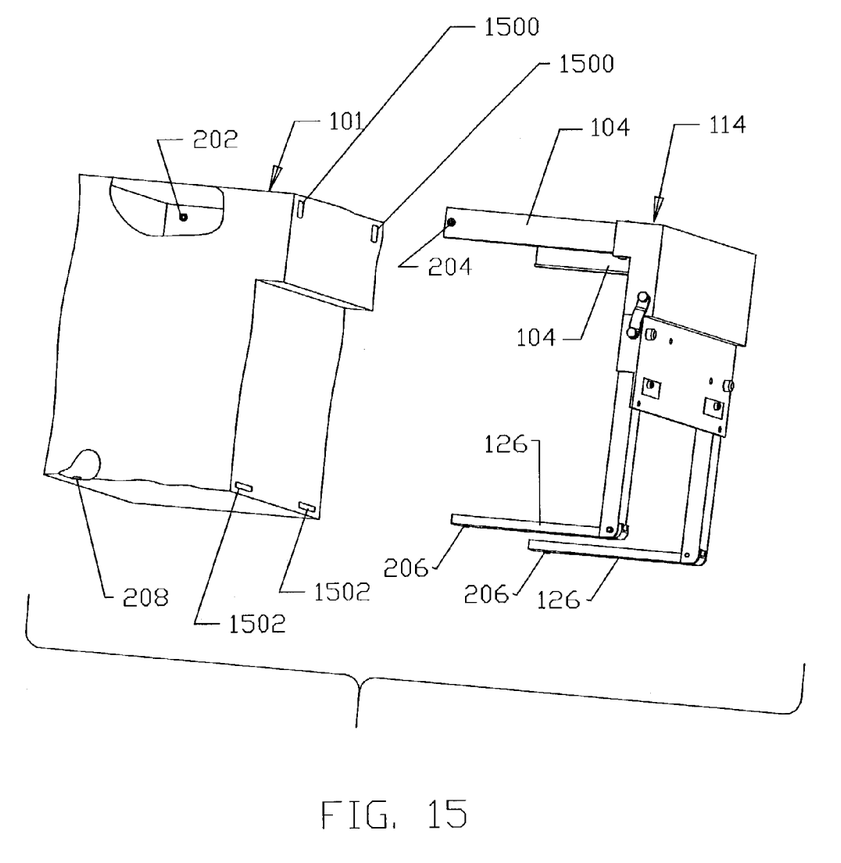
FIG. 15 is an alternative embodiment of the apparatus of FIG. 2.

FIG. 15 shows another variation of the invention, where the bag 101 is external to the support arms 104, 126. Upper support arms 104 pass through openings such as slits 1500, and lower support arms 126 pass through openings such as slits 1502, for support of the bag 101. The snaps 204 and 206 face outward rather inward as in FIG. 2, and the mating snaps 202 and 208 (shown in imaginary cutouts in bag 101) similarly face inward rather than outward as in FIG. 2. The bag 101 is therefore supported internally rather than externally as in FIG. 2.

The invention is not limited to the preferred mode illustrated. For instance, the invention is shown as mounted on a rear fender, but could be mounted on, or integral to, the vehicle in other locations, such as a front fender, fairing, seat, brace, dashboard, or other location. Collapse of the frame is illustrated by hinges, pivots, and stops, but other methods of flexure, such as a cloth hinge, would be applicable. Sealing of the bag is illustrated by zipper, but other sealing methods such as snaps, buckles, or Velcro® would be usable. Connection of the bag to the frame is illustrated as snaps, but other methods such as buckles, welding, or Velcro® would be applicable. These and other variants are within the spirit and scope of the claims below.

What is claimed is:

1. A collapsible storage system (100) for use on a motor vehicle (502), comprising:
   A. a collapsible support frame (114) with at least one connection location (605) for connecting to the motor vehicle;
   B. and a collapsible storage bag (101) connected to the support frame;
   C. where the storage bag and support frame collapse in more than one dimension (104, 126).

2. The apparatus of claim 1, where the support frame collapses in the vertical dimension (114).

3. The apparatus of claim 1, where the support frame collapses in three dimensions (104, 125).

4. The apparatus of claim 2, where the support frame collapses using pivots (132).

5. The apparatus of claim 1, where the support frame collapses toward the connection location.

6. The apparatus of claim 5, where the support frame is internal to the vehicle.

7. The apparatus of claim 5, where the support frame is external to the vehicle.

8. The apparatus of claim 7, where the support frame is hand-removable from the vehicle exterior.

9. The apparatus of claim 2, where a cover (110) connected to the support frame, rotates to collapse.

10. The apparatus of claim 1, where the support frame comprises two upper (104) and two lower (126) support arms.

11. The apparatus of claim 1, where the lower support frame consists of a single (125) support.

12. The apparatus of claim 9, where the support frame includes two upper (104) and two lower (126) support arms.

13. The apparatus of claim 10, where one or more support arms lock into both deployed and collapsed states.

14. The apparatus of claim 13, where lock is accomplished by spring detents (130).

15. The apparatus of claim 1, where the support frame is external to the storage bag.

16. The apparatus of claim 1, where support arms (104, 126) are internal to the storage bag.

17. The apparatus of claim 16, where the support arms pass through openings (1500, 1502) into the storage bag.

18. The apparatus of claim 1, where the storage bag includes a sealing mechanism (102).

19. The apparatus of claim 1, where the storage bag is connected to the support frame by snaps (202, 204, 206, 208).

20. The apparatus of claim 8, where the vehicle is a motorcycle.

21. The apparatus of claim 20, additionally comprising connectors (603) which connect the connection locations to the vehicle.

22. The apparatus of claim 6, where the vehicle is a two-wheeled vehicle.

23. The apparatus of claim 22, where the connection location is a fender (127).

24. A collapsible storage system (100) for use on a motorcycle, comprising:
   A. a support frame (114) and storage bag (101) which collapse in more than one dimension (104, 126) with at least one connection location (605) for connecting to the motorcycle, said support frame including
   B. two upper (104) and two lower (126) support arms which move into both deployed and collapsed states;
   C. where the collapsible storage bag (101) is connected to the support frame by snaps (202, 204, 206, 208), said storage bag including
   D. a sealing mechanism (102) which is a zipper.

25. A collapsible storage system (100) for use on a motorcycle, comprising:
   A. a support frame (114) and storage bag (101) which collapse in more than one dimension (104, 126), with
   B. means (603) for connecting the support frame to the motorcycle;
   C. means (204) for connecting the collapsible storage bag (101) to the support frame;
   D. and means (102) for sealing the storage bag.

* * * * *